(12) United States Patent
Sipe (10) Patent No.: US 7,888,927 B2
(45) Date of Patent: Feb. 15, 2011

(54) DEVICE FOR LOCATING SITES HIDDEN BEHIND A COVERING SURFACE

(76) Inventor: Mark Sipe, 4691 S. Palacio Way, Gold Canyon, AZ (US) 85218

( * ) Notice: Subject to any disclaimer, the term of this patent is extended or adjusted under 35 U.S.C. 154(b) by 723 days.

(21) Appl. No.: 11/426,910

(22) Filed: Jun. 27, 2006

(65) Prior Publication Data

US 2006/0288576 A1 Dec. 28, 2006

Related U.S. Application Data

(60) Provisional application No. 60/595,386, filed on Jun. 28, 2005.

(51) Int. Cl.
*G01V 3/08* (2006.01)
(52) U.S. Cl. .............. 324/67; 29/729; 116/204
(58) Field of Classification Search ........... 324/67; 335/302; 33/364; 439/107; 116/204; 29/729
See application file for complete search history.

(56) References Cited

U.S. PATENT DOCUMENTS

| | | | | |
|---|---|---|---|---|
| 1,491,593 A * | 4/1924 | Eriksen | ............ | 33/364 |
| 3,510,822 A * | 5/1970 | Patterson | ............ | 439/107 |
| 4,384,396 A | 5/1983 | Smolik | | |
| 4,388,890 A * | 6/1983 | Wester et al. | ............ | 116/204 |
| 5,516,068 A * | 5/1996 | Rice | ............ | 248/300 |
| 6,708,421 B1 | 3/2004 | Crorey | | |
| 6,839,244 B1 | 1/2005 | Rood | ............ | 361/826 |
| 7,183,885 B2 * | 2/2007 | Nellessen et al. | ............ | 335/302 |

FOREIGN PATENT DOCUMENTS

EP 466108 A1 * 1/1992

* cited by examiner

*Primary Examiner*—A. Dexter Tugbang
*Assistant Examiner*—Livius R Cazan
(74) *Attorney, Agent, or Firm*—The von Hellens Law Firm, Ltd.

(57) ABSTRACT

The invention provides for a system and method for locating concealed locations such as wiring, plumbing, or void locations with respect to a covering material like a wall. The system comprises a position indicating portion that is concealed on one side of a covering material and a position locating portion positioned on the opposite side and adjacent to the covering material. The position indicating portion is coupled to any structural member using a mounting mechanism, thereby establishing the location of a site by creating a magnetic field extending through said covering material at that location. The position locating portion comprises a position locating magnet while the position indicating portion comprises a position indicating magnet. The position locating magnet cooperates repulsively and attractively through the covering material with a position indicating magnet in order to locate the concealed site by substantially aligning the position indicating portion and the position locating portion.

2 Claims, 8 Drawing Sheets

DEVICE FOR LOCATING SITES HIDDEN BEHIND A COVERING SURFACE

This application claims priority to U.S. Provisional Application Ser. No. 60/595,386, filed Jun. 28, 2005, by Mark Sipe and entitled "XSPOT AND XSPOT LOCATOR TOOL", which is incorporated herein by reference in its entirety.

BACKGROUND OF THE INVENTION

1. Technical Field

This invention relates to a system and method for locating pre-established sites behind a covering material like a wall or ceiling, and more specifically the invention provides a system and method for locating marked sites while eliminating false findings of unmarked sites.

2. Background Art

During the construction of buildings and structures, objects or bodies such as wiring, plumbing, or pest control tubes are mounted with respect to structural frame members such as wood or metal studs. After the bodies are mounted to the structural frame members, a covering material such as drywall, paneling, or plywood is placed over the structural members, concealing the objects or bodies mounted to the internal structural members. Further construction efforts, subsequent modification work, or repair efforts may require the covering material to be cut or pierced to expose the internal components.

Conventional devices and methods exist for locating and accessing a narrow class of objects such as electrical boxes. One such device, as described in U.S. Pat. No. 4,384,396, utilizes an "apparatus and method for use in installation of an electrical receptacle box and in particular for use in cutting an access opening in wallboard installed in covering relationship to the electrical receptacle box" which utilizes "first and second magnets having opposite polarity." (abstract) Another such device, as described in U.S. Pat. No. 6,708,421, utilizes "a locating device for locating a body such as an electrical box behind a wall or ceiling" wherein magnets are utilized in order to locate the body. (abstract) Magnets, however, are attracted to a variety of items which may be located within a wall. Consequently, a system and method is needed to expand the ability to mark and locate any object, body, position, member, etc. concealed by some covering material.

Conventional systems and methods are based on the attraction of magnets to locate concealed sites. These systems tend to contemplate use of the magnets in configurations where the magnets will attract each other as a means of locating concealed sites. These conventional systems are deficient in providing a way to differentiate between a locating device being magnetically attracted to a concealed magnet or to a concealed metallic object such as a nail or metal stud.

Consequently there is a need for a system and method for utilizing the polarity of magnets as a means of locating only marked locations while eliminating false positives occurring when a locating magnet is attracted to a metallic body that behaves like a temporary magnet due to the magnetic field produced by the locating magnet.

DISCLOSURE OF THE INVENTION

The invention provides for a system for locating any pre-established concealed location such as wiring, plumbing, or a void location with respect to a covering material such as plywood, drywall, or paneling. The system comprises a position indicating magnet that is concealed by the covering material and a position locating magnet positioned outside and adjacent to the covering material; wherein the position locating magnet cooperates repulsively and attractively with the position indicating magnet in order to detect the position indicating magnet and substantially align the position indicating magnet and the position locating magnet.

One embodiment of this invention provides a system for locating any pre-established concealed location with respect to a covering material. The system comprises a position indicating device and a position locating device. The position indicating device comprises a position indicating magnet coupled to a position indicating magnet housing. The position indicating device is coupled to an internal structural member using a mounting mechanism, thereby establishing the location of any marked site by creating a magnetic field extending through said covering material at that location. The apparatus also comprises a position locating device positioned outside and adjacent to the covering material. The position locating device comprises a position locating magnet coupled with a position locating magnet housing, wherein the polarity of the position locating magnet may be alternated by shifting the physical orientation of the position locating magnet housing, wherein the position indicating magnet may cooperate repulsively and attractively with the position locating magnet in order to detect the position indicating magnet and substantially align the position indicating magnet device and the position locating magnet device.

This invention also provides a method for locating any pre-established concealed location with respect to the covering material. The method comprises first marking the desired location by positioning the position indicating device at the desired location. Positioning the position indicating device is accomplished by coupling the position indicating device to a mounting mechanism which is coupled to an internal structural member. Once a covering material has been put in place, the method further comprises positioning and moving the position locating device adjacent and external to the covering material wherein the position indicating magnet will cooperate repulsively with the position locating magnet to find the hidden location. The polarity of the position locating magnet may then be reversed and the magnets then behave attractively in order to suspend the position locating device on the surface of the covering material, thereby achieving substantial alignment of the position indicating magnet and the position locating magnet. Once the location has been confirmed and the position locating device aligned, a marking instrument may be used to mark the covering surface in that location prior to cutting into the covering material.

The foregoing and other features and advantages of the invention will be apparent to those of ordinary skill in the art from the following more particular description of the invention and the accompanying drawing.

BRIEF DESCRIPTION OF THE DRAWINGS

The invention will hereinafter be described in conjunction with the appended drawings where like designations denote like elements, and.

DESCRIPTION OF THE PREFERRED EMBODIMENT

As discussed above, embodiments of the present invention relate to a system and method of locating sites concealed, hidden, or buried by a covering material. Various embodiments of the invention are shown throughout the figures. The figures include common elements in different structural configurations. Common elements are designated with a common base numeral and differentiated with an alphabetic designation.

Figure 1:
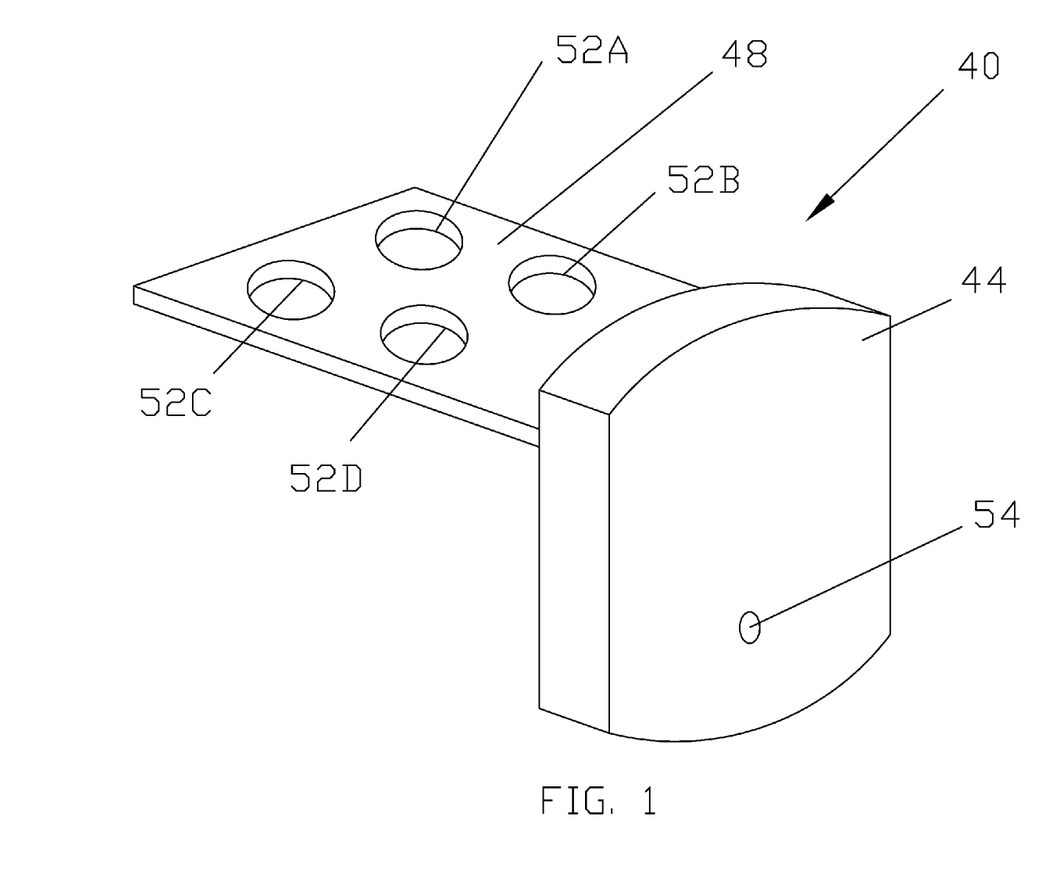
FIG. 1 is an isometric view of an embodiment of a position indicating device.
Figure 2:
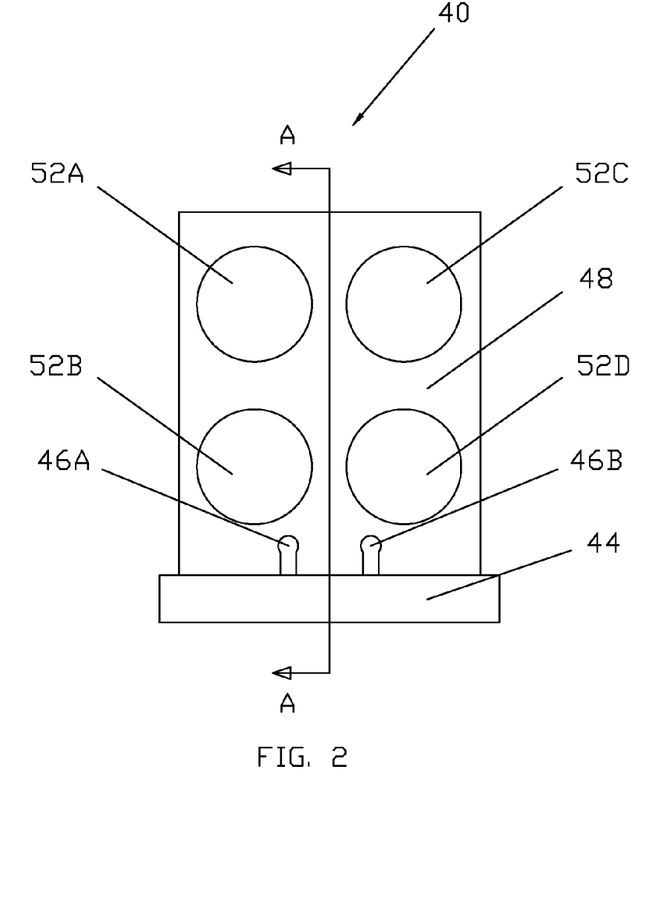
FIG. 2 is a bottom view of an embodiment of a position indicating device.
Figure 3:
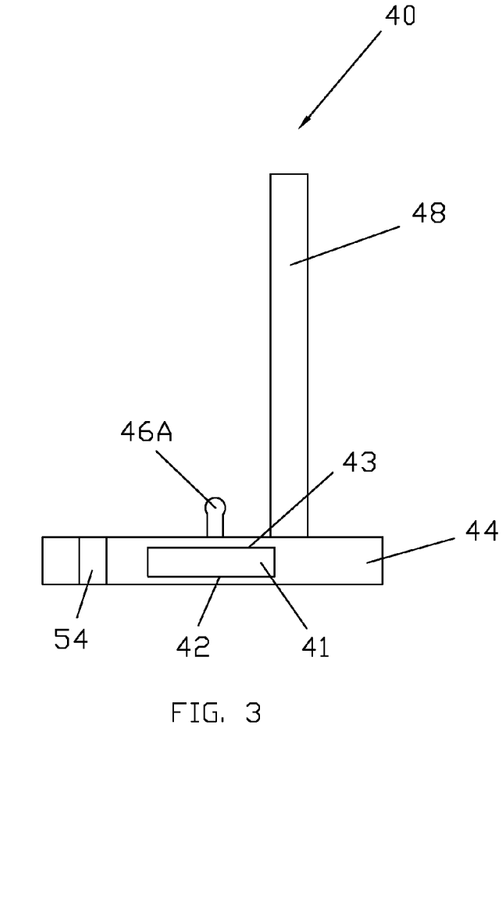
FIG. 3 is a sectional view of the position indicating device of FIG. 2 taken along the line A-A.

FIGS. 1, 2, and 3 illustrate a position indicating device 40 which may comprise a position indicating magnet 41, a position indicating magnet housing 44, wire strap pins 46*a, b*, housing apertures 54, and a wire tab 48 with a plurality of wire tab apertures 52*a, b, c, d*. In one embodiment the position indicating magnet 41 is a cylindrical permanent magnet comprising two faces, wherein one face 42 has positive (northern) polarity and one face 43 has negative (southern) polarity. The position indicating magnet 41 may comprise magnets of a plurality of shapes, sizes, and strengths such that the magnetic field of a position indicating magnet 41 positioned adjacent to one side of a covering material is able to extend through said covering material.

The position indicating magnet housing 44 comprises a housing that may consist of a plurality of materials and that may be various shapes and sizes. The position indicating magnet housing 44 may couple with the position indicating magnet 41, thereby fixing the placement of the position indicating magnet 41 within the housing 44. The fixing of the placement of the position indicating magnet 41 within the position indicating magnet housing 44 will determine the polarity of the position indicating magnet with respect to the position indicating magnet housing 44. In the embodiment shown in FIGS. 1-3, the housing comprises material shaped in the form of a disk with opposing sides of the disk having been cut and removed.

The position indicating magnet housing 44 may comprise one or a plurality of housing apertures 54, wherein wiring may be fed through a housing aperture 54, thereby restraining the location of the pre-wire with respect to the position indicating magnet housing 44. In the depicted embodiment, the housing aperture 54 comprises a cylindrical hole in the housing material passing from the front side of the position indicating magnet housing 44 to the back side of the position indicating magnet housing 44. The housing apertures 54 may also comprise a plurality of apertures passing through the position indicating magnet housing 44 of a variety of shapes and sizes.

In the depicted embodiment the position indicating magnet housing 44 may also comprise mounting strap pins 46*a, b*, whereby the position indicating device 40 may couple with mounting mechanisms. The mounting strap pins 46*a, b* comprise male pin shaped protrusions that would couple with female apertures on a mounting mechanism. The mounting strap pins 46*a, b* are larger in diameter at the tip than the female aperture they may couple with in order to ensure a pressure fit and secure coupling. It is also contemplated that the position indicating magnet housing 44 may comprise other coupling mechanisms like a clip, clasp, snap, button, hook and loop mechanism, or any other coupling mechanism whereby the position indicating device 40 may couple with a mounting mechanism or concealed structural member.

Figure 6:
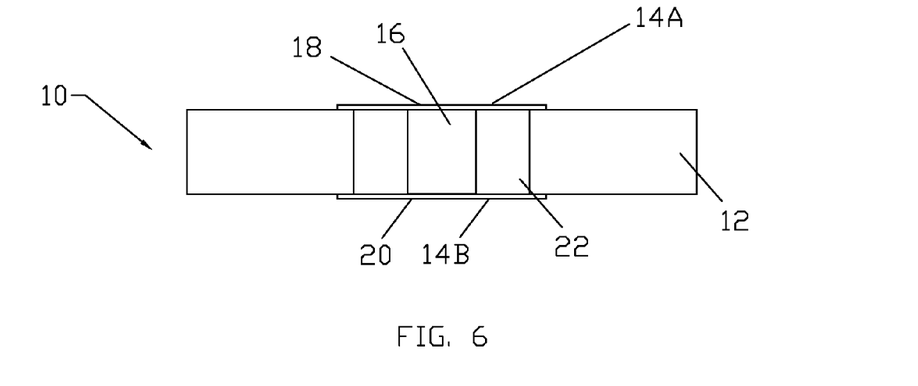
FIG. 6 is a sectional view of the position locating device of FIG. 5 taken along the line B-B.

The position indicating magnet housing 44 may also comprise a wire tab 48 coupled to the housing 44, and in which a plurality of wire tab apertures 52*a, b, c, d* provide a system for restraining multiple concealed wires 50, see FIG. 6. In the depicted embodiment the wire tab 48 is a rectangular parallelepiped with four cylindrical wire tab apertures 52*a, b, c, d* passing through the wire tab 48 from the top surface to the bottom surface. The wire tab 48 may couple to the back side of the housing 44 and protrude back at a perpendicular angle to the front face of the position indicating magnet housing 44. Wires may be fed through 74, see FIG. 10, the wire tab apertures 52 thereby restraining their location with respect to the position indicating device 40. The wire tab 48 may comprise various quantities of apertures 52 of a variety of shapes set in a variety of configurations, including multiple or single columns of wire tab apertures 52.

In another embodiment, the position indicating device 40 may comprise a plurality of magnets configured in order to assist in identification of the feature marked by the position indicating device 40. The plurality of magnets may be coupled with a position indicating housing 44 in a plurality of configurations, and in a plurality of combinations of polarity with some magnets having positive polarity facing a covering surface and some magnets having negative polarity facing a covering surface. The number and configuration of those magnets having positive polarity and those magnets having negative polarity can be set in order to communicate information through a covering material as to what type of feature is being marked at a given site. For example, a position indicating device 40 may comprise two magnets, one of which is coupled to the position indicating device housing 44 with positive polarity and one is coupled to the position indicating device housing 44 with negative polarity. This configuration would be known to mark only plumbing fixtures, wherein a subsequent user, unfamiliar with what sites were initially marked may receive information as to what type of site was marked. Various configurations of magnets could be established to mark plumbing, electrical boxes, wall boxes, loose wiring, insect tubing, studs, a void site, or any other desirable feature that may need to be marked. Additionally, a scanning device would locate the concealed position indicating devices 40 and sense the magnetic configuration of each position indicating device 40, wherein a user may learn the type of concealed feature that had been marked at each site.

Figure 7:
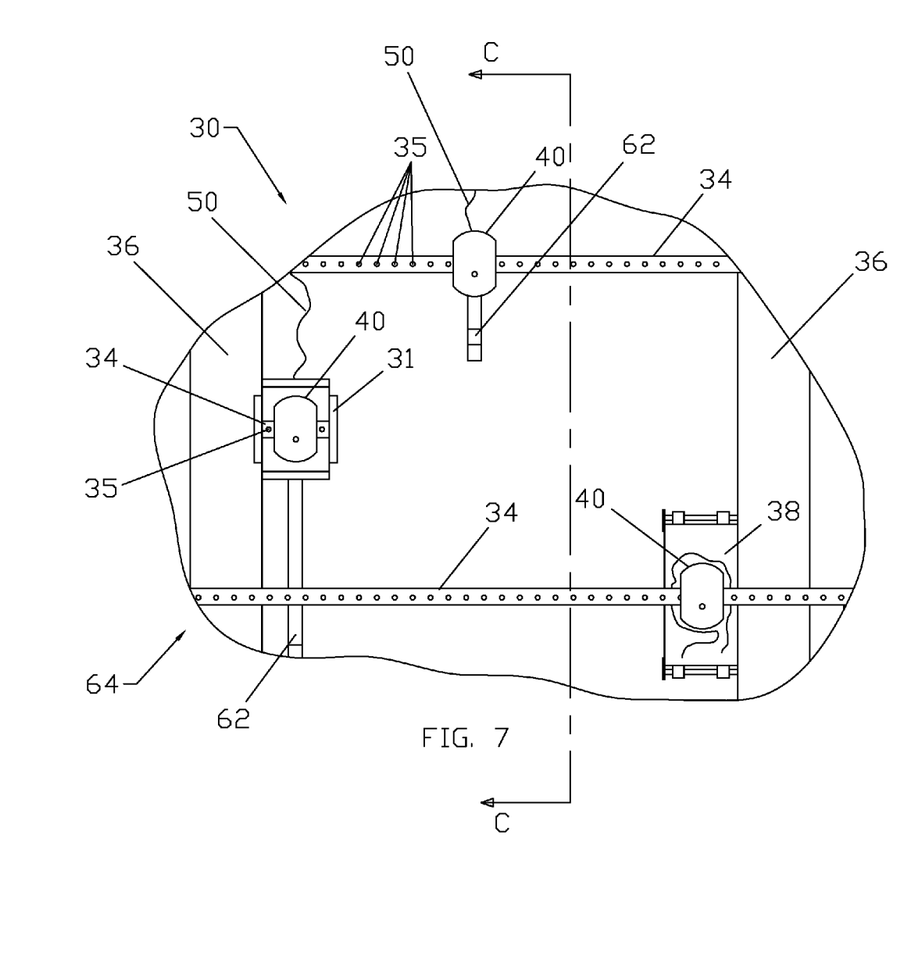
FIG. 7 is a front view with a cut out of the internal features of an area concealed by a covering material.
Figure 8:
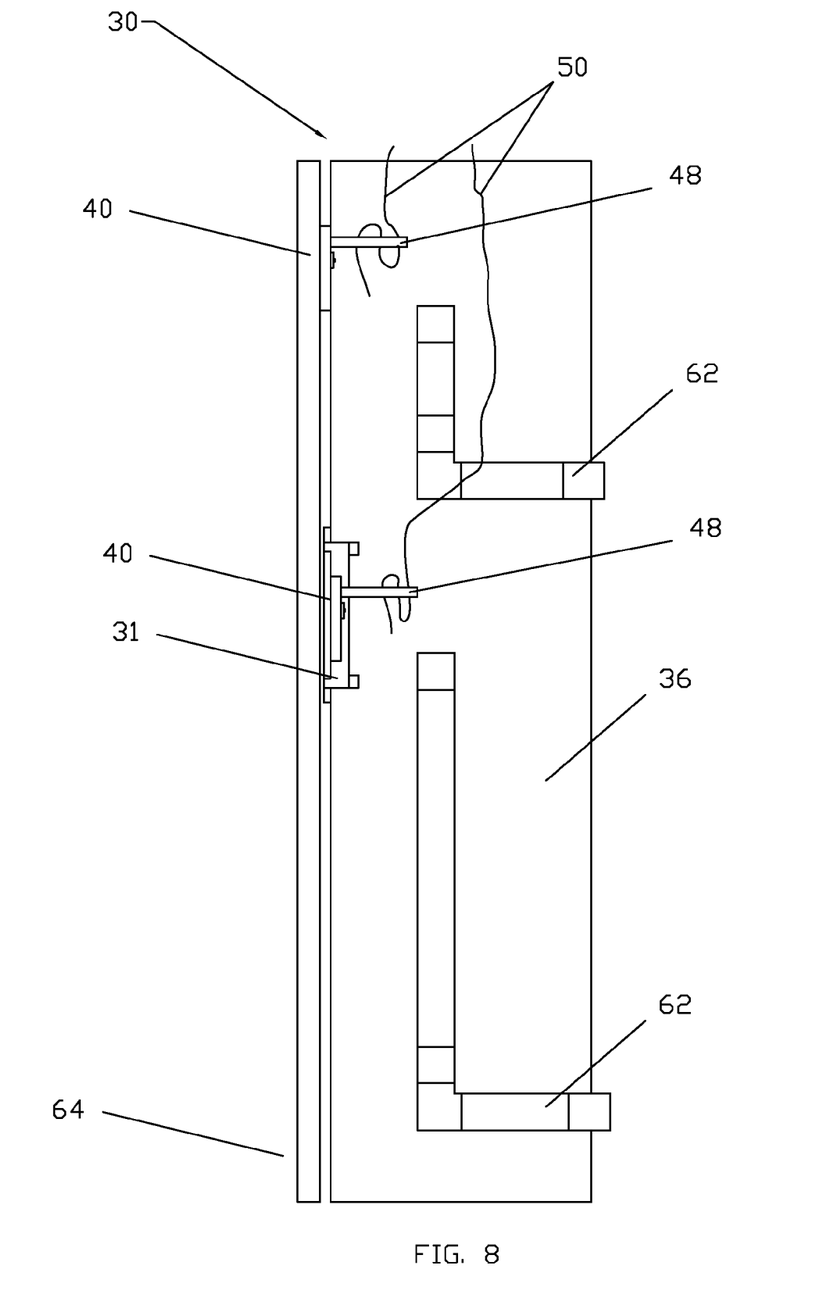
FIG. 8 is a sectional view of FIG. 7 taken along the line C-C, depicting a location concealed by covering material in which position indicating devices have been installed.

FIGS. 7 and 8 illustrates a wall arrangement 30 comprising a frame structure 36, covering material 64, a position indicating device 40 coupled to a mounting strap 34, a position indicating device 40 coupled to a wall box 31, a position indicating device 40 coupled to mounting strap 34 marking the location of a electrical box 38, plumbing fixtures 62, and wiring 50. The frame structure 36 may include wood studs, metal studs, ceiling joists, beams, or any other building member or framing member. The wall arrangement 30 illustrates, but is not limited to, possible configurations for coupling position indicating devices 40 to an internal frame structure 36. While the embodiment depicted is a wall arrangement 30, it is understood that the current invention may be used with any location concealed by a covering material including, but not limited to, walls, ceiling and floors in homes, walls, ceiling and floors in other buildings, covered surfaces in other structures, covered surfaces in boats, aircraft, automobiles, and any other covered surface suitable for the use of this invention.

The mounting strap 34 may be constructed from a variety of materials and may be rigid or flexible. The mounting strap 34 may comprise flexible and severable material that may be rolled or folded, or may comprise pre-cut ridged lengths of strapping. In the depicted embodiment the mounting strap 34 comprises strapping of a rectangular cross section. Also in this embodiment the mounting strap 34 also comprises a plurality of cylindrical apertures 35 along the length of the strap 34 passing through the strap from the front to the back, wherein the position indicating magnet housing pins 46a, b, see FIG. 2, may couple with 72, see FIG. 10, the mounting strap 34 using any of the apertures 35 as locations to insert the mounting strap pins 46a, b, see FIG. 2. The mounting strap 34 may also be configured to accept coupling of a position indicating device 40 by means such as, but not limited to, a clip, a clasp, a button, a snap, hook and loop, a screw or other suitable coupling mechanisms. The mounting strap 34 may couple with 70, see FIG. 10, any frame member 36 including, but not limited to, ceiling joists, wall studs, beams, or other framing member, whereby coupling may be made by, but not limited to stapling, nailing, nail plates, nail brackets, screwing, adhering, or taping. The mounting strap 34 may be coupled to any frame members 36, wherein the location of any site may be marked such as electrical box 38 locations, plumbing 62 locations, electrical wiring locations 50, void locations, or any other location where marking may be desired.

In the depicted embodiment the wall box 31 is a box shaped part comprising various apertures for various construction purposes. The wall box 31 may couple 70, see FIG. 10, with any structure member 36 including, but not limited to, ceiling joists, wall studs, beams, or framing members, whereby coupling may be made by, but not limited to stapling, nailing, nail plates, nail brackets, screwing, adhering, or taping, wherein the wall box 31 further comprises a portion of mounting strap 34. The portion of mounting strap 34 may comprise a plurality of cylindrical apertures 35 along the length of the mounting strap 34 portion, wherein the position indicating magnet housing pins 46a, b may couple with 72, see FIG. 10, the mounting strap 34 portion using any of the apertures 35 as pin 46 insert locations. The mounting strap 34 portion may also be configured to accept coupling 72, see FIG. 10, of a position indicating device 40 by means such as, but not limited to, a clip, clasp, button, snap, screw, hook and loop mechanism, or other suitable coupling mechanisms. The wall box 31 may also comprise any other components or apertures useful for the marking of desired objects including but not limited to apertures for securing wiring 50, apertures for securing plumbing 62, or any other feature that may prove useful in construction efforts.

Figure 4:
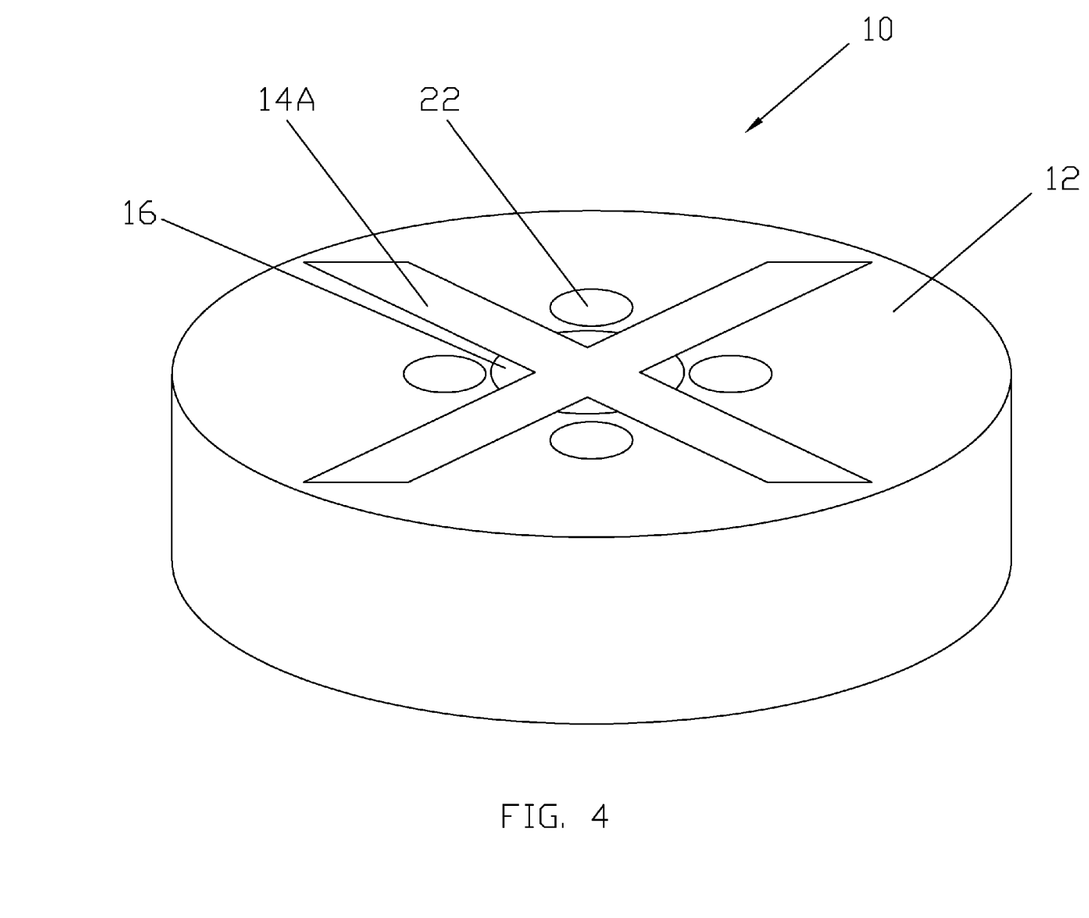
FIG. 4 is an isometric view of an embodiment of a position locating device.
Figure 5:
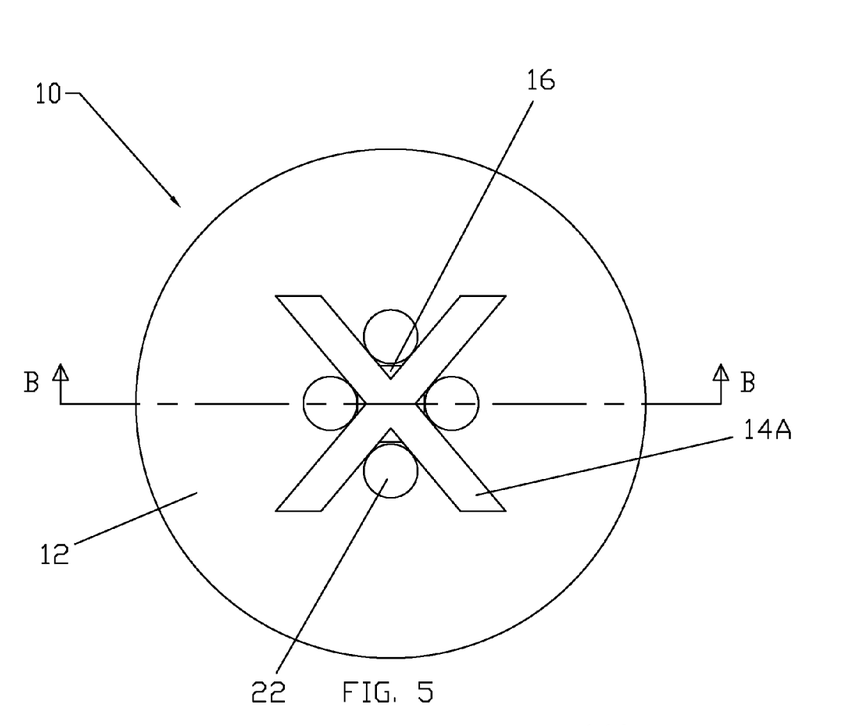
FIG. 5 is a front view of an embodiment of a position locating device.

FIGS. 4, 5, 6 illustrate a position locating device 10 which may comprise a position locating magnet 16, a position locating magnet housing 12, marking apertures 22, and protective coverings 14. In the depicted embodiment the position locating magnet 16 is a cylindrical permanent magnet comprising two faces, wherein one face 18 has positive (northern) polarity and one face 20 has negative (southern) polarity. The position locating magnet 16 may also comprise permanent magnets of a plurality of shapes, sizes, and strengths such that the position locating magnet 16 may direct both positive 18 and negative 20 polarity magnetic fields through a covering material to a concealed position indicating magnet 41, see FIG. 1.

The position locating magnet housing 12 may comprise a housing that may consist of a plurality of materials and that may be various shapes and sizes. The position locating magnet housing 12 may couple with the position locating magnet 16, thereby fixing the placement of the position locating magnet 16 within the housing 12. The fixing of the placement of the position locating magnet 16 within the position locating magnet housing 12 will determine the polarity of the position locating magnet 16 with respect to the position locating magnet housing 12. In the embodiment shown in FIGS. 4-6, the housing 12 comprises material shaped in the form of a disk.

In the depicted embodiment the marking apertures 22 comprise cylindrical apertures passing through the body of the position locating device housing 12 from the front to the back. In other embodiments the position locating device 10 may comprise one or a plurality of marking apertures 22 of a variety of shapes and configurations. In the depicted embodiment, the four marking apertures 22 are used to mark a location of a concealed site on a covering material. Marking may be accomplished by inserting a marking instrument, for example, but not limited to, a pencil, pen, marker, chalk, or any other marking instrument, into a marking aperture 22, wherein a mark is left on the covering surface. The same process is followed with each of the apertures, after which a user may utilize the marks in order to draw an X to mark the location of the concealed site.

In this embodiment protective coverings 14a, b are coupled to the front and back side of the position locating magnet housing 12 in order to protect a surface material 64, see FIG. 6, from damage associated with the movement of the position locating device 10 across the surface of the covering material 64. The protective coverings may comprise a portion of material including, but not limited to, foam, rubber, paper, fabric, cotton, or any other material suitable for protecting a covering surface 64. The position locating device 10 may be utilized in both the positive 18 and negative 20 polarity configuration due to the protective coverings 14a, b existing on both front and back of the position locating magnet housing 12. The protective covering 14 may couple with the position locating housing 12 by any suitable coupling device including, but not limited to adhesives of various types.

It is also considered that the position locating device 10 may include textual information. The textual information may include, for example, information relating to the magnetic polarity of each side of the device. The textual information may be formed integral with the position locating magnet housing, for example stamped or molded with respect to the housing. Alternatively, the textual information may be engaged with the devices such as with an adhesive label.

Figure 9:
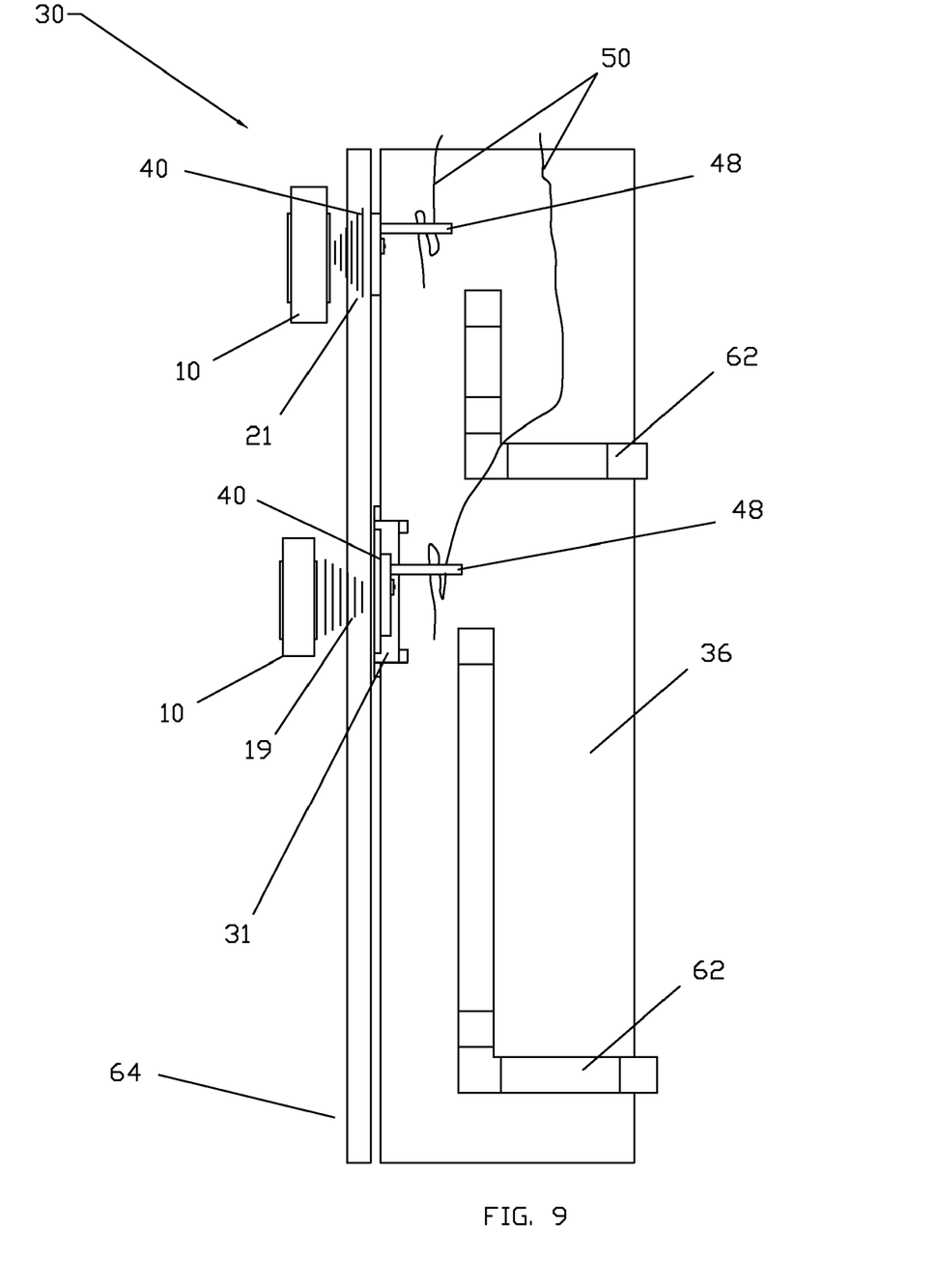
FIG. 9 is a sectional view of FIG. 7 taken along the line C-C, depicting a location concealed by covering material in which position indicating devices have been installed and in which position locating devices are being demonstrated.

As shown in FIG. 9, the position locating device 10 configured to positive polarity would sense a repulsive force 19 when moved into the vicinity of a position indicating device 40 configured to the same polarity, and would sense an attractive force 21 when moved into the vicinity of a position indicating device 40 configured to the opposite polarity. Similarly, the position locating device 10 configured to negative polarity would sense a repulsive force 19 when moved into the vicinity of a position indicating device 40 configured to the same polarity, and would sense an attractive force 21 when moved into the vicinity of a position indicating device 40 configured to the opposite polarity. Regardless of the polarity configuration of the position indicating device 40, the position locating device 10 will be operational in sensing both repulsive 19 and attractive 21 forces in the presence of a position indicating magnet 41. In the present embodiment the polarity of the position indicating device 40 may be predetermined based on the configuration of the position indicating magnet 41 when coupled with the position indicating magnet housing 44, see FIG. 1. After installation 76, see FIG. 10, of the covering material 64, and based on this pre-determined polarity of the position indicating device 40, the position locating device 10 may be positioned 78, see FIG. 10, adjacent to the covering material 64 set to the same polarity as the position indicating device 40. The position locating device 10 may then be moved 80, see FIG. 10, relative to the covering surface 64 until the position locating device 10 senses the repelling force 19 resulting from the interaction between the position locating device 10 and the position indicating device 40 concealed in that vicinity. If, upon moving the position locating device 10, an attractive force 21 is sensed, the user may know that the attractive force 21 is not a result of interaction between the position locating device 10 and the position indicating device 40, but rather an interaction between the position locating device 10 and a temporary magnet (an item which is itself not magnetic, but is attracted to a magnet) such as, but not limited to nails, electrical boxes, metal studs, or any other metallic object that is magnetically attracted to a permanent magnet. A user may choose to switch the orientation of the position locating device 10 to verify the finding of a temporary magnet such as a nail. If the position locating device 10 senses an attractive force 21 in both configurations of polarity of the position locating device 10, a temporary magnet has been located and the location can be ignored.

When the position locating device 10 senses a repelling force 19, the polarity of the position locating device 10 may be switched by placing the opposing side of the position locating device 10 adjacent to the covering surface 64 in the vicinity where the repelling force 19 was sensed. The position locating device 10 may then be moved in minor increments until the position locating device 10 senses an attractive force 21.

The position locating device 10 may have a specified weight such that the attractive magnetic force between the position locating device 10 and the position indicating device 40 is sufficient to maintain the position of the position locating device on the covering surface 64 with no additional support when the position locating device 10 and the position indicating device 40 are substantially aligned.

Figure 10:
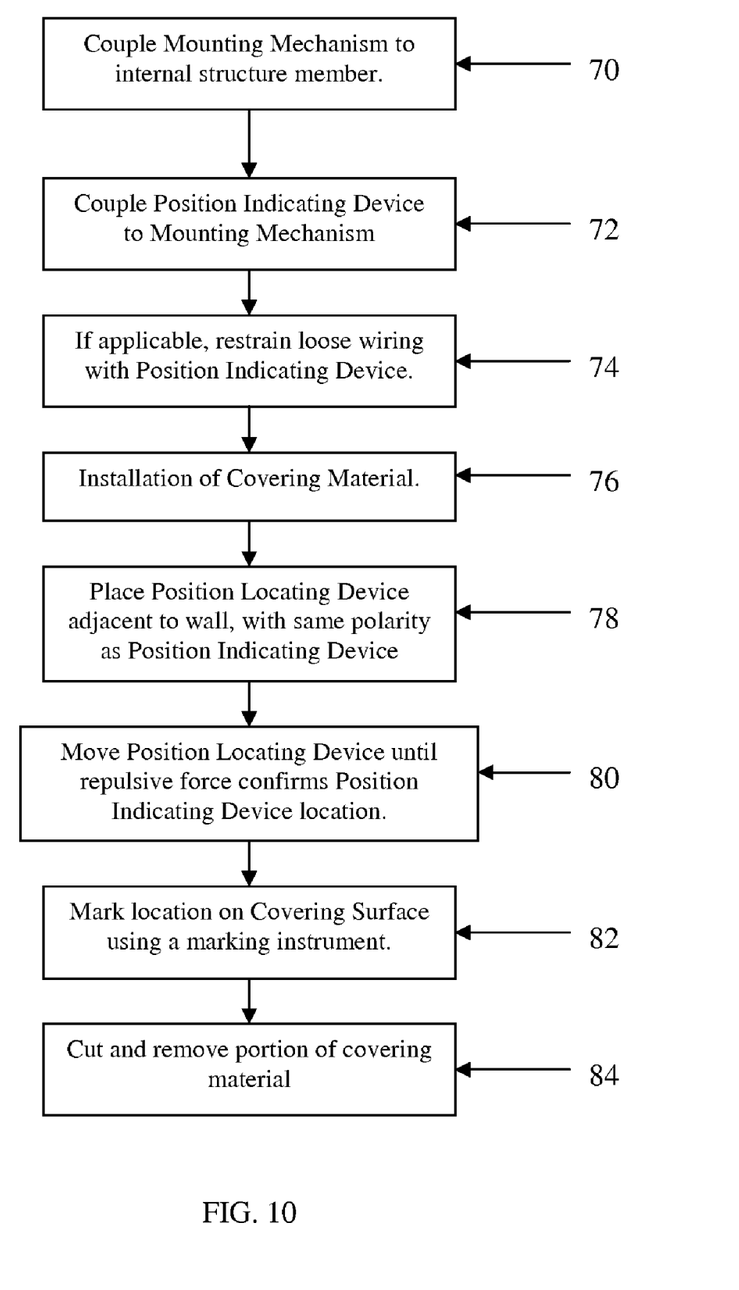
FIG. 10 depicts a flowchart of an exemplary method for use with the system of FIG. 9.

Upon alignment of the position locating device 10, a user may mark the location 82, see FIG. 10, of the position indicating device 10 on the covering surface by inserting a marking instrument in the marking apertures 22, see FIG. 4, wherein the position will be marked on the covering surface 64. The marked covering material 64 can then be cut 84, see FIG. 10, and the surface covering removed to gain access to the concealed location.

In another embodiment the position locating magnet 10 may be an electromagnet capable of producing both negative and positive polarity. The electromagnet with electrical components may be coupled with the position locating magnet housing 12, and the polarity may be changed electronically, thereby eliminating the need to physically rotate the position locating device 10. The polarity of the electromagnet may be changed by use of, for example, but not limited to, a switch, button, or the like.

Referring now to FIG. 10, the method for locating any pre-established concealed location with respect to a covering material comprises the following steps. Initially, during construction of the structure, and prior to installation of a covering material, position indicating devices 40 are positioned in the structure with respect to the desired site to be marked. This positioning may comprise coupling of a mounting mechanism 70, for example a mounting strap or a wall box, to a structural member including, but not limited to, ceiling joists, wall studs, beams, or other framing member, whereby coupling may be made by, but not limited to stapling, nailing, nail plates, nail brackets, screwing, adhering, or taping. Next, position indicating devices 40 are coupled to the mounting mechanism 72 at all sites desired to be marked. If the location is marking the site of wiring, the wiring may be restrained 74 by use of the wire tab or wire apertures in the position indicating magnet housing.

After a covering material has been installed 76 and a user has a need to locate one or more pre-established concealed sites, a position locating device 10 will be positioned adjacent and external to the visible side of the covering material 78 with polarity of the position locating device matching the polarity as the position indicating magnet. The position locating device 10 may then be moved adjacent to the covering material 80 until the repulsive force due to the position indicating magnet device is sensed. Next the position locating device 10 may then be placed adjacent to covering material in the vicinity of the repulsion confirmed area, position locating device 10 set to the opposite polarity. The position locating device 10 may then moved incrementally until the position locating device 10 senses the attractive forces between the position indicating magnet and the position locating magnet. As discussed, the attractive force may be sufficient to maintain the position of the position locating device 10 on the covering surface adjacent and aligned with the position indicating device 40. A user may then employ a marking instrument, like a pencil, pen, marker, or chalk, or any other marking instrument, to mark the location 82 of the concealed site on the surface of the covering material. A user may utilize the marking apertures on the position locating magnet housing to mark the desired location. Lastly a cutting tool may be employed to pierce, cut, or remove a portion of the covering material 84, thereby gaining access to the desired site.

The embodiments and examples set forth herein were presented in order to best explain the present invention and its practical applications and to thereby enable those of ordinary skill in the art to make and use the invention. However, those of ordinary skill in the art will recognize that the foregoing description and examples have been presented for the purposes of illustration and example only. The description as set forth is not intended to be exhaustive or to limit the invention to the precise form disclosed. Many modifications and variations are possible in light of the teachings above without departing from the spirit and scope of the forthcoming claims. Accordingly, any components of the present invention indicated in the drawings or herein are given as an example of possible components and not as a limitation.

The invention claimed is:

1. A device for locating a pre-established location hidden behind a covering material of a wall, said device comprising in combination:
   a) a position indicating device located at the hidden location proximate a rear surface of the covering material, said position indicating device including a first single magnet, a first housing for supporting said magnet, at least one wire tab extending from said housing for engagement by at least one electrical wire; and
   b) a position locating device movable adjacent a front surface of the covering material, said position locating device including a second and single magnet, a second housing comprising a disc for supporting said second magnet therein, a plurality of apertures extending through said disc to provide access to adjacent covering material, said second magnet being is disposed at the center of said disc and wherein said plurality of apertures comprises four apertures disposed radially outwardly of said second magnet, said position locating device being locatable adjacent the covering material to orient said second magnet in a first state to establish a magnetic attraction between said first and second magnets and to orient said second magnet in a second state to establish a magnetic repulsion between said first and second magnets.

2. A device for locating a pre-established location hidden behind a covering material of a wall, said device comprising in combination:

a) a position indicating device located at the hidden location proximate a rear surface of the covering material, said position indicating device including a first single magnet, a first housing for supporting said magnet, at least one wire tab extending from said housing for engagement by at least one electrical wire; and b) a position locating device movable adjacent a front surface of the covering material, said position locating device including a second and single magnet, a second housing comprising a disc for supporting said second magnet therein, at least one aperture extending through said disc and a protective covering disposed on each side of said disc, each of said protective coverings being in the shape of an X, said position locating device being locatable adjacent the covering material to orient said second magnet in a first state to establish a magnetic attraction between said first and second magnets and to orient said second magnet in a second state to establish a magnetic repulsion between said first and second magnets.

* * * * *